(12) United States Patent
Dickson et al.

(10) Patent No.: US 11,585,672 B1
(45) Date of Patent: Feb. 21, 2023

(54) THREE-DIMENSIONAL REPRESENTATIONS OF ROUTES

(71) Applicant: Palantir Technologies Inc., Palo Alto, CA (US)

(72) Inventors: Richard Dickson, Brooklyn, NY (US); Mason Cooper, Cincinnati, OH (US); Quentin Le Pape, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 121 days.

(21) Appl. No.: 16/000,231

(22) Filed: Jun. 5, 2018

Related U.S. Application Data

(60) Provisional application No. 62/656,089, filed on Apr. 11, 2018.

(51) Int. Cl.
*G01C 21/36* (2006.01)
*G08G 1/0967* (2006.01)
*G06F 16/29* (2019.01)

(52) U.S. Cl.
CPC ....... *G01C 21/3638* (2013.01); *G01C 21/367* (2013.01); *G01C 21/3694* (2013.01);
(Continued)

(58) Field of Classification Search
CPC ............ G01C 21/3638; G01C 21/3694; G01C 21/367; G01C 21/3423; G01C 21/35; G01C 21/36–3697; G01C 21/3896; G01C 21/34–3492; G01C 21/26; G06F 16/29; G08G 1/0967; B60W 30/16;
(Continued)

(56) References Cited

U.S. PATENT DOCUMENTS 4,899,161 A 2/1990 Morin et al.
4,958,305 A 9/1990 Piazza
(Continued)

FOREIGN PATENT DOCUMENTS

AU 2012216622 5/2015
DE 102013222023 1/2015
(Continued)

OTHER PUBLICATIONS

"A First Look: Predicting Market Demand for Food Retail using a Huff Analysis," TRF Policy Solutions, Jul. 2012, pp. 30.
(Continued)

*Primary Examiner* — Fadey S. Jabr
*Assistant Examiner* — Mohamed Abdo Algehaim
(74) *Attorney, Agent, or Firm* — Sheppard Mullin Richter & Hampton LLP

(57) ABSTRACT

Systems, methods, and non-transitory computer readable media configured to provide three-dimensional representations of routes. Locations for a planned movement may be obtained. The location information may include tridimensional information of a location. Route information for the planned movement may be obtained. The route information may define a route of one or more entities within the location. A three-dimensional view of the route within the location may be determined based on the location information and the route information. An interface through which the three-dimensional view of the route within the location is accessible may be provided.

17 Claims, 6 Drawing Sheets

(52) U.S. Cl.
CPC ......... *G01C 21/3697* (2013.01); *G06F 16/29* (2019.01); *G08G 1/0967* (2013.01)

(58) Field of Classification Search
CPC .. B60W 30/162; B60W 30/165; B60W 30/14; B60W 30/143; B60W 30/146; B60W 10/00–2900/00; G05D 1/0044; G05D 1/00–1/12; G06V 20/13; G06V 20/17; G06Q 10/00–2250/905
USPC .................................................. 701/436, 96
See application file for complete search history.

(56) References Cited

U.S. PATENT DOCUMENTS

| | | | |
|---|---|---|---|
| 5,329,108 | A | 7/1994 | Lamoure |
| 5,754,182 | A | 5/1998 | Kobayashi |
| 5,781,195 | A | 7/1998 | Marvin |
| 5,781,704 | A | 7/1998 | Rossmo |
| 6,091,956 | A | 7/2000 | Hollenberg |
| 6,157,747 | A | 12/2000 | Szeliski et al. |
| 6,169,552 | B1 | 1/2001 | Endo et al. |
| 6,173,067 | B1 | 1/2001 | Payton et al. |
| 6,178,432 | B1 | 1/2001 | Cook et al. |
| 6,247,019 | B1 | 6/2001 | Davies |
| 6,389,289 | B1 | 5/2002 | Voce et al. |
| 6,414,683 | B1 | 7/2002 | Gueziec |
| 6,483,509 | B1 | 11/2002 | Rabenhorst |
| 6,529,900 | B1 | 3/2003 | Patterson et al. |
| 6,631,496 | B1 | 10/2003 | Li et al. |
| 6,662,103 | B1 | 12/2003 | Skolnick et al. |
| 6,757,445 | B1 | 6/2004 | Knopp |
| 6,828,920 | B2 | 12/2004 | Owen et al. |
| 6,983,203 | B1 | 1/2006 | Wako |
| 6,985,950 | B1 | 1/2006 | Hanson et al. |
| 7,036,085 | B2 | 4/2006 | Barros |
| 7,158,878 | B2 | 1/2007 | Rasmussen et al. |
| 7,375,732 | B2 | 5/2008 | Areas |
| 7,379,811 | B2 | 5/2008 | Rasmussen et al. |
| 7,457,706 | B2 | 11/2008 | Malero et al. |
| 7,502,786 | B2 | 3/2009 | Liu et al. |
| 7,519,470 | B2 | 4/2009 | Brasche et al. |
| 7,529,195 | B2 | 5/2009 | Gorman |
| 7,539,666 | B2 | 5/2009 | Ashworth et al. |
| 7,558,677 | B2 | 7/2009 | Jones |
| 7,574,428 | B2 | 8/2009 | Leiserowitz et al. |
| 7,579,965 | B2 | 8/2009 | Bucholz |
| 7,617,314 | B1 | 11/2009 | Bansod et al. |
| 7,620,628 | B2 | 11/2009 | Kapur et al. |
| 7,663,621 | B1 | 2/2010 | Allen et al. |
| 7,791,616 | B2 | 9/2010 | Ioup et al. |
| 7,805,457 | B1 | 9/2010 | Viola et al. |
| 7,809,703 | B2 | 10/2010 | Balabhadrapatruni et al. |
| 7,872,647 | B2 | 1/2011 | Mayer et al. |
| 7,894,984 | B2 | 2/2011 | Rasmussen et al. |
| 7,899,611 | B2 | 3/2011 | Downs et al. |
| 7,920,963 | B2 | 4/2011 | Jouline et al. |
| 7,945,852 | B1 | 5/2011 | Pilskains |
| 7,962,281 | B2 | 6/2011 | Rasmussen et al. |
| 7,970,240 | B1 | 6/2011 | Chao et al. |
| 8,010,545 | B2 | 8/2011 | Stefik et al. |
| 8,036,632 | B1 | 10/2011 | Cona et al. |
| 8,065,080 | B2 | 11/2011 | Koch |
| 8,085,268 | B2 | 12/2011 | Carrino et al. |
| 8,134,457 | B2 | 3/2012 | Velipasalar et al. |
| 8,145,703 | B2 | 3/2012 | Frishert et al. |
| 8,200,676 | B2 | 6/2012 | Frank |
| 8,214,361 | B1 | 7/2012 | Sandler et al. |
| 8,214,764 | B2 | 7/2012 | Gemmell et al. |
| 8,229,947 | B2 | 7/2012 | Fujinaga |
| 8,230,333 | B2 | 7/2012 | Decherd et al. |
| 8,290,942 | B2 | 10/2012 | Jones et al. |
| 8,290,943 | B2 | 10/2012 | Carbone et al. |
| 8,301,464 | B1 | 10/2012 | Cave et al. |
| 8,325,178 | B1 * | 12/2012 | Doyle, Jr. ............... G06T 17/05 345/419 |
| 8,368,695 | B2 | 2/2013 | Howell et al. |
| 8,397,171 | B2 | 3/2013 | Klassen et al. |
| 8,400,448 | B1 | 3/2013 | Doyle, Jr. |
| 8,407,180 | B1 | 3/2013 | Ramesh et al. |
| 8,412,234 | B1 | 4/2013 | Gatmir-Motahari et al. |
| 8,412,707 | B1 | 4/2013 | Mianji |
| 8,422,825 | B1 | 4/2013 | Neophytou et al. |
| 8,452,790 | B1 | 5/2013 | Mianji |
| 8,463,036 | B1 | 6/2013 | Ramesh et al. |
| 8,487,957 | B1 * | 7/2013 | Bailly ....................... G06T 3/40 345/619 |
| 8,489,331 | B2 | 7/2013 | Kopf et al. |
| 8,489,641 | B1 | 7/2013 | Seefeld et al. |
| 8,498,984 | B1 | 7/2013 | Hwang et al. |
| 8,508,533 | B2 | 8/2013 | Cervelli et al. |
| 8,514,229 | B2 | 8/2013 | Cervelli et al. |
| 8,515,207 | B2 | 8/2013 | Chau |
| 8,564,596 | B2 | 10/2013 | Carrino et al. |
| 8,606,493 | B1 * | 12/2013 | Gold ....................... G01C 21/26 701/436 |
| 8,666,657 | B2 * | 3/2014 | Meadow ................. G06F 16/78 701/436 |
| 8,725,411 | B2 * | 5/2014 | Samokhin .......... G01C 21/3638 701/436 |
| 8,742,934 | B1 | 6/2014 | Sarpy et al. |
| 8,781,169 | B2 | 7/2014 | Jackson et al. |
| 8,799,799 | B1 | 8/2014 | Cervelli et al. |
| 8,830,322 | B2 | 9/2014 | Nerayoff et al. |
| 8,862,392 | B2 * | 10/2014 | Spindler ............ G01C 21/3638 701/436 |
| 8,880,336 | B2 * | 11/2014 | van Os .............. G01C 21/3635 345/173 |
| 8,892,357 | B2 * | 11/2014 | Feyereisen ............. G01C 21/00 340/995.14 |
| 8,938,686 | B1 | 1/2015 | Erenrich et al. |
| 8,949,164 | B1 | 2/2015 | Mohler |
| 8,983,494 | B1 | 3/2015 | Onnen et al. |
| 9,009,177 | B2 | 4/2015 | Zheng et al. |
| 9,021,384 | B1 | 4/2015 | Beard et al. |
| 9,031,781 | B2 * | 5/2015 | Li ...................... G01C 21/3697 701/431 |
| 9,104,293 | B1 | 8/2015 | Kornfeld et al. |
| 9,104,695 | B1 | 8/2015 | Cervelli et al. |
| 9,111,380 | B2 | 8/2015 | Piemonte et al. |
| 9,129,219 | B1 | 9/2015 | Robertson et al. |
| 9,146,125 | B2 | 9/2015 | Vulcano et al. |
| 9,280,618 | B1 | 3/2016 | Bruce et al. |
| 10,026,279 | B1 * | 7/2018 | Beller ..................... G08B 25/10 |
| 10,233,021 | B1 * | 3/2019 | Brady .................. G06Q 10/047 |
| 10,573,149 | B1 * | 2/2020 | Jordan, II ............ G06Q 50/163 |
| 2002/0003539 | A1 | 1/2002 | Abe |
| 2002/0033848 | A1 | 3/2002 | Sciammarella et al. |
| 2002/0116120 | A1 | 8/2002 | Ruiz et al. |
| 2002/0130867 | A1 | 9/2002 | Yang et al. |
| 2002/0130906 | A1 | 9/2002 | Miyaki |
| 2003/0052896 | A1 | 3/2003 | Higgins et al. |
| 2003/0103049 | A1 | 6/2003 | Kindratenko et al. |
| 2003/0144868 | A1 | 7/2003 | MacIntyre et al. |
| 2003/0163352 | A1 | 8/2003 | Surpin et al. |
| 2003/0225755 | A1 | 12/2003 | Iwayama et al. |
| 2004/0030492 | A1 | 2/2004 | Fox et al. |
| 2004/0039498 | A1 | 2/2004 | Ollis et al. |
| 2004/0098236 | A1 | 5/2004 | Mayer et al. |
| 2005/0031197 | A1 | 2/2005 | Knopp |
| 2005/0034062 | A1 | 2/2005 | Bufkin et al. |
| 2005/0080769 | A1 | 4/2005 | Gemmell |
| 2005/0143602 | A1 | 6/2005 | Yada et al. |
| 2005/0162523 | A1 | 7/2005 | Darrell et al. |
| 2005/0182502 | A1 | 8/2005 | Iyengar |
| 2005/0182793 | A1 | 8/2005 | Keenan et al. |
| 2005/0223044 | A1 | 10/2005 | Ashworth et al. |
| 2005/0267652 | A1 | 12/2005 | Allstadt et al. |
| 2006/0026170 | A1 | 2/2006 | Kreitler et al. |
| 2006/0139375 | A1 | 6/2006 | Rasmussen et al. |
| 2006/0146050 | A1 | 7/2006 | Yamauchi |
| 2006/0149596 | A1 | 7/2006 | Surpin et al. |
| 2006/0200384 | A1 | 9/2006 | Arutunian et al. |
| 2006/0251307 | A1 | 11/2006 | Florin et al. |

(56) References Cited

U.S. PATENT DOCUMENTS

| | | |
|---|---|---|
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0057966 A1 | 3/2007 | Ohno et al. |
| 2007/0078832 A1 | 4/2007 | Ott et al. |
| 2007/0115373 A1 | 5/2007 | Gallagher et al. |
| 2007/0188516 A1 | 8/2007 | Loup et al. |
| 2007/0208497 A1 | 9/2007 | Downs et al. |
| 2007/0208498 A1 | 9/2007 | Barker et al. |
| 2007/0258642 A1 | 11/2007 | Thota |
| 2007/0294643 A1 | 12/2007 | Kyle |
| 2008/0010605 A1 | 1/2008 | Frank |
| 2008/0040684 A1 | 2/2008 | Crump |
| 2008/0043020 A1* | 2/2008 | Snow ............... G01C 21/3635 345/427 |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0133579 A1 | 6/2008 | Lim |
| 2008/0163073 A1 | 7/2008 | Becker et al. |
| 2008/0192053 A1 | 8/2008 | Howell et al. |
| 2008/0195417 A1 | 8/2008 | Surpin et al. |
| 2008/0223834 A1 | 9/2008 | Griffiths et al. |
| 2008/0229056 A1 | 9/2008 | Agarwal et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0115786 A1 | 5/2009 | Shmiasaki et al. |
| 2009/0119001 A1* | 5/2009 | Moussaeiff ...... G08G 1/096883 701/532 |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0222400 A1 | 9/2009 | Kupershmidt et al. |
| 2009/0292626 A1 | 11/2009 | Oxford |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0076968 A1 | 3/2010 | Boyns et al. |
| 2010/0106420 A1 | 4/2010 | Mattikalli et al. |
| 2010/0162176 A1 | 6/2010 | Dunton |
| 2010/0185692 A1 | 7/2010 | Zhang et al. |
| 2010/0198684 A1 | 8/2010 | Eraker et al. |
| 2010/0199225 A1 | 8/2010 | Coleman et al. |
| 2010/0277611 A1 | 11/2010 | Holt et al. |
| 2010/0293174 A1 | 11/2010 | Bennett et al. |
| 2010/0321399 A1 | 12/2010 | Ellren et al. |
| 2011/0022312 A1 | 1/2011 | McDonough et al. |
| 2011/0090254 A1 | 4/2011 | Carrino et al. |
| 2011/0117878 A1 | 5/2011 | Barash et al. |
| 2011/0137766 A1 | 6/2011 | Rasmussen et al. |
| 2011/0153368 A1 | 6/2011 | Pierre et al. |
| 2011/0161096 A1 | 6/2011 | Buehler et al. |
| 2011/0170799 A1 | 7/2011 | Carrino et al. |
| 2011/0208724 A1 | 8/2011 | Jones et al. |
| 2011/0215985 A1* | 9/2011 | Kaplan ................. H01Q 21/08 343/879 |
| 2011/0218934 A1 | 9/2011 | Elser |
| 2011/0225198 A1 | 9/2011 | Edwards et al. |
| 2011/0238690 A1 | 9/2011 | Arrasvuori et al. |
| 2011/0270705 A1 | 11/2011 | Parker |
| 2012/0066296 A1 | 3/2012 | Appleton et al. |
| 2012/0084118 A1 | 4/2012 | Bai et al. |
| 2012/0106801 A1 | 5/2012 | Jackson |
| 2012/0123822 A1* | 5/2012 | Hnatio .................. G06Q 50/26 705/7.28 |
| 2012/0144335 A1 | 6/2012 | Abeln et al. |
| 2012/0158527 A1 | 6/2012 | Cannelongo et al. |
| 2012/0159363 A1 | 6/2012 | DeBacker et al. |
| 2012/0173985 A1 | 7/2012 | Peppel |
| 2012/0206469 A1 | 8/2012 | Hulubei et al. |
| 2012/0208636 A1 | 8/2012 | Feige |
| 2012/0221580 A1 | 8/2012 | Barney |
| 2011/0323888 | 12/2012 | Osann, Jr. |
| 2012/0323888 A1 | 12/2012 | Osann, Jr. |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0100134 A1 | 4/2013 | Cervelli et al. |
| 2013/0101159 A1 | 4/2013 | Chao et al. |
| 2013/0124084 A1* | 5/2013 | Seo ................... G01C 21/3638 701/436 |
| 2013/0131978 A1* | 5/2013 | Han .................. G01C 21/3638 701/436 |
| 2013/0132398 A1 | 5/2013 | Pfiefle |
| 2013/0150004 A1 | 6/2013 | Rosen |
| 2013/0176321 A1 | 7/2013 | Mitchell et al. |
| 2013/0179420 A1 | 7/2013 | Park et al. |
| 2013/0242074 A1* | 9/2013 | Sekiguchi ............. G08B 7/066 348/77 |
| 2013/0254900 A1 | 9/2013 | Sathish et al. |
| 2013/0268520 A1 | 10/2013 | Fisher et al. |
| 2013/0279757 A1 | 10/2013 | Kephart |
| 2013/0282723 A1 | 10/2013 | Petersen et al. |
| 2013/0339891 A1 | 12/2013 | Blumenberg et al. |
| 2014/0167969 A1* | 6/2014 | Wedig ................. G08B 7/066 340/584 |
| 2014/0176606 A1 | 6/2014 | Narayan et al. |
| 2014/0218400 A1 | 8/2014 | O'Toole et al. |
| 2014/0333651 A1 | 11/2014 | Cervelli et al. |
| 2014/0337772 A1 | 11/2014 | Cervelli et al. |
| 2014/0343840 A1* | 11/2014 | Seo ...................... G06T 15/503 701/436 |
| 2014/0361899 A1 | 12/2014 | Layson |
| 2015/0029176 A1 | 1/2015 | Baxter et al. |
| 2015/0049086 A1* | 2/2015 | Morato ............... G06T 3/0031 345/427 |
| 2015/0100907 A1 | 4/2015 | Erenrich et al. |
| 2015/0106170 A1 | 4/2015 | Bonica |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0312323 A1 | 10/2015 | Peterson |
| 2015/0338233 A1 | 11/2015 | Cervelli et al. |
| 2015/0379413 A1 | 12/2015 | Robertson et al. |
| 2016/0284038 A1* | 9/2016 | Johnson .............. G16H 50/00 |
| 2016/0307287 A1* | 10/2016 | Jat ...................... G06Q 30/0631 |
| 2017/0008521 A1* | 1/2017 | Braunstein ....... G08G 1/096805 |
| 2017/0089710 A1* | 3/2017 | Slusar ..................... B60R 1/00 |
| 2017/0090478 A1* | 3/2017 | Blayvas .............. G07C 5/0808 |
| 2017/0122749 A1* | 5/2017 | Urano .................... G01S 19/42 |
| 2017/0276495 A1* | 9/2017 | Krishnan ......... G08G 1/096741 |
| 2017/0337485 A1* | 11/2017 | Mullaly ................ G06N 99/00 |
| 2017/0369059 A1* | 12/2017 | Schuberth ........... B60W 30/143 |
| 2018/0060989 A1* | 3/2018 | Hietanen ............... G06Q 30/04 |
| 2018/0112990 A1* | 4/2018 | Fowe ................. G01C 21/3484 |
| 2018/0164107 A1* | 6/2018 | Yalla ................. G01C 21/3461 |
| 2018/0198955 A1* | 7/2018 | Watanabe ............... G08G 1/16 |
| 2018/0211541 A1* | 7/2018 | Rakah ............... B60W 60/00253 |
| 2018/0218214 A1* | 8/2018 | Pestun ..................... G06T 17/05 |
| 2018/0309592 A1* | 10/2018 | Stolfus ................. H04L 47/122 |
| 2018/0322702 A1* | 11/2018 | Djajadiningrat ........ A61B 5/332 |
| 2018/0365942 A1* | 12/2018 | Molloy ................... H04W 4/90 |
| 2019/0017839 A1* | 1/2019 | Eyler .................... G01C 21/32 |

(56) References Cited

U.S. PATENT DOCUMENTS

| | | | |
|---|---|---|---|
| 2019/0023270 A1* | 1/2019 | Hayashi | B60W 30/08 |
| 2019/0025821 A1* | 1/2019 | Salomon | G01C 21/3438 |
| 2019/0186938 A1* | 6/2019 | Pasukonis | G01C 21/3484 |
| 2019/0188977 A1* | 6/2019 | Moses | H04W 4/024 |
| 2019/0202463 A1* | 7/2019 | Anderson | B60W 50/0097 |
| 2019/0208392 A1* | 7/2019 | Merjanian | G06V 20/20 |
| 2019/0241183 A1* | 8/2019 | Han | B60W 30/165 |
| 2019/0265703 A1* | 8/2019 | Hicok | G06Q 50/30 |
| 2019/0302990 A1* | 10/2019 | Unnikrishnan | G06T 3/00 |
| 2019/0304292 A1* | 10/2019 | Merjanian | H04W 4/02 |
| 2019/0311614 A1* | 10/2019 | Yang | G05D 1/0246 |
| 2019/0332120 A1* | 10/2019 | Choi | G06F 16/29 |
| 2019/0339088 A1* | 11/2019 | Jeswani | G01C 21/3691 |
| 2020/0151816 A1* | 5/2020 | Simpson | G06Q 20/4015 |
| 2020/0182637 A1* | 6/2020 | Kumar | G06Q 50/14 |
| 2021/0034866 A1* | 2/2021 | Appel | G06V 10/764 |

FOREIGN PATENT DOCUMENTS

| | | |
|---|---|---|
| EP | 0 763 201 | 3/1997 |
| EP | 2 575 107 | 4/2013 |
| EP | 2858014 | 4/2015 |
| EP | 2963595 | 1/2016 |
| GB | 2516155 | 1/2015 |
| NL | 2012778 | 11/2014 |
| NZ | 624557 | 12/2014 |
| WO | WO 95/032424 | 11/1995 |
| WO | WO 2000/009529 | 2/2000 |
| WO | WO 2001/098925 | 12/2001 |
| WO | WO 2004/057268 | 7/2004 |
| WO | WO 2005/013200 | 2/2005 |
| WO | WO 2008/064207 | 5/2008 |
| WO | WO 2009/061501 | 5/2009 |
| WO | WO 2009/123975 | 10/2009 |
| WO | WO 2011/058507 | 5/2011 |

OTHER PUBLICATIONS

"Andy Turner's GISRUK 2012 Notes" <https://docs.google.com/document/d/1cTmxg7mVx5gd89lqblCYvCEnHA4QAivH4l4WpyPsqE4/edit?pli=1> printed Sep. 16, 2013 in 15 pages.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

Barnes et al., "Viewshed Analysis", GIS-ARC/Info 2001, <www.evsc.virginia.edu/~jhp7e/evsc466/student_pres/Rounds.pdf>.

Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Definition "Identify", downloaded Jan. 22, 2015, 1 page.

Definition "Overlay", downloaded Jan. 22, 2015, 1 page.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Ghosh, P., "A Solution of Polygon Containment, Spatial Planning, and Other Related Problems Using Minkowski Operations," Computer Vision, Graphics, and Image Processing, 1990, vol. 49, pp. 1-35.

GIS-NET 3 Public_Department of Regional Planning. Planning & Zoning Information for Unincorporated LA County. Retrieved Oct. 2, 2013 from http://gis.planning.lacounty.gov/GIS-NET3_Public/Viewer.html.

Gorr et al., "Crime Hot Spot Forecasting: Modeling and Comparative Evaluation", Grant 98-IJ-CX-K005, May 6, 2002, 37 pages.

Griffith, Daniel A., "A Generalized Huff Model," Geographical Analysis, Apr. 1982, vol. 14, No. 2, pp. 135-144.

Haralick et al., "Image Analysis Using Mathematical Morphology," Pattern Analysis and Machine Intelligence, IEEE Transactions, Jul. 1987, vol. PAMI-9, No. 4, pp. 532-550.

Hibbert et al., "Prediction of Shopping Behavior Using a Huff Model Within a GIS Framework," Healthy Eating in Context, Mar. 18, 2011, pp. 16.

Huang et al., "Systematic and Integrative Analysis of Large Gene Lists Using DAVID Bioinformatics Resources," Nature Protocols, 4.1, 2008, 44-57.

Huff et al., "Calibrating the Huff Model Using ArcGIS Business Analyst," ESRI, Sep. 2008, pp. 33.

Huff, David L., "Parameter Estimation in the Huff Model," ESRI, ArcUser, Oct.-Dec. 2003, pp. 34-36.

Ipbucker, C., "Inverse Transformation for Several Pseudo-cylindrical Map Projections Using Jacobian Matrix," ICCSA 2009, Part 1 LNCS 5592, pp. 553-564.

Levine, N., "Crime Mapping and the Crimestat Program," Geographical Analysis, 2006, vol. 38, pp. 41-56.

Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.

Mandagere, Nagapramod, "Buffer Operations in GIS," <http://www-users.cs.umn.edu/~npramod/enc_pdf.pdf> retrieved Jan. 28, 2010, pp. 7.

Map Builder, "Rapid Mashup Development Tool for Google and Yahoo Maps!" <http://web.archive.org/web/20090626224734/http://www.mapbuilder.net/> printed Jul. 20, 2012 in 2 pages.

Map of San Jose, CA. Retrieved Oct. 2, 2013 from http://maps.yahoo.com.

Map of San Jose, CA. Retrieved Oct. 2, 2013 from http://maps.bing.com.

Map of San Jose, CA. Retrieved Oct. 2, 2013 from http://maps.google.com.

Murray, C., Oracle Spatial Developer's Guide—6 Coordinate Systems (Spatial Reference Systems), <http://docs.oracle.com/cd/B28359_01/appdev.111/b28400.pdf>, Jun. 2009.

Open Street Map, "Amm's Diary:Unconnected ways and other data quality issues," http://www.openstreetmap.org/user/amm/diary printed Jul. 23, 2012 in 3 pages.

POI Editor, "How To: Create Your Own Points of Interest," <http://www.poieditor.com/articles/how_to_create_your_own_points_of_interest/> printed Jul. 22, 2012 in 4 pages.

Pozzi et al., "Vegetation and Population Density in Urban and Suburban Areas in the U.S.A." Third International Symposium of Remote Sensing of Urban Areas Istanbul, Turkey, Jun. 2002, pp. 8.

Qiu, Fang, "3d Analysis and Surface Modeling", <http://web.archive.org/web/20091202221925/http://www.utsa.edu/lrsg/Teaching/EES6513/08-3D.pdf> printed Sep. 16, 2013 in 26 pages.

Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.

Reibel et al., "Areal Interpolation of Population Counts Using Pre-classi_ed Land Cover Data," Population Research and Policy Review, 2007, vol. 26, pp. 619-633.

Reibel, M., "Geographic Information Systems and Spatial Data Processing in Demography: a Review," Population Research and Policy Review, 2007, vol. 26, pp. 601-618.

Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.

Snyder, "Map Projections—A Working Manual," U.S. Geological Survey Professional paper 1395, United States Government Printing Office, Washington: 1987, pp. 11-21 and 60-70.

Sonris, "Using the Area of Interest Tools," <http://web.archive.org/web/20061001053327/http://sonris-www.dnr.state.la.us/gis/instruct_files/tutslide12> printed Jan. 3, 2013 in 1 page.

Tangelder et al., "Freeform Shape Matching Using Minkowski Operations," The Netherlands, Jun. 1996, pp. 12.

(56) References Cited

OTHER PUBLICATIONS

Thompson, Mick, "Getting Started with GEO," Getting Started with GEO, Jul. 26, 2011.

Valentini et al., "Ensembles of Learning Machines", M. Marinaro and R. Tagliaferri (Eds.): WIRN VIETRI 2002, LNCS 2486, pp. 3-20.

VB Forums, "Buffer A Polygon," Internet Citation, <http://www.vbforums.com/showthread.php?198436-Buffer-a-Polygon>, Specifically Thread #1, #5 & #11 retrieved on May 2, 2013, pp. 8.

Vivid Solutions, "JTS Topology Suite: Technical Specifications," <http://www.vividsolutions.com/jts/bin/JTS%20Technical%20Specs.pdf> Version 1.4, 2003, pp. 36.

Wikipedia, "Douglas_Peucker—Algorithms," <http://de.wikipedia.org/w/index.php?title=Douglas-Peucker-Algorithmus&oldid=91846042> printed Jul. 2011, pp. 2.

Wikipedia, "Ramer_Douglas_Peucker Algorithm," <http://en.wikipedia.org/wiki/Ramer%E2%80%93Douglas%E2%80%93Peucker_algorithm> printed Jul. 2011, pp. 3.

Wongsuphasawat et al., "Visual Analytics for Transportation Incident Data Sets," Transportation Research Record 2138, 2009, pp. 135-145.

Woodbridge, Stephen, "[geos-devel] Polygon simplification," <http://lists.osgeo.org/pipermail/geos-devel/2011-May/005210.html> dated May 8, 2011, pp. 3.

\* cited by examiner

THREE-DIMENSIONAL REPRESENTATIONS OF ROUTES

CROSS REFERENCE TO RELATED APPLICATIONS

This application claims the benefit under 35 U.S.C. § 119(e) of U.S. Provisional Application Ser. No. 62/656,089, filed Apr. 11, 2018, the content of which is incorporated by reference in its entirety into the present disclosure.

FIELD OF THE INVENTION

This disclosure relates to approaches for providing three-dimensional representations of routes.

BACKGROUND

Under conventional approaches, a route within a location may be overlaid on top of a two-dimensional representation of the location. Such representation of the route may result in loss of information relating to the route and/or location.

SUMMARY

Various embodiments of the present disclosure may include systems, methods, and non-transitory computer readable media configured to provide three-dimensional representations of routes. Location information for a planned movement may be obtained. The location information may include tridimensional information of a location. Route information for the planned movement may be obtained. The route information may define a route of one or more entities within the location. A three-dimensional view of the route within the location may be determined based on the location information and the route information. An interface through which the three-dimensional view of the route within the location is accessible may be provided.

In some embodiments, the tridimensional information may define three-dimensional geographic characteristics of the location. The location may include man-made structures or natural structures, and the tridimensional information may define three-dimensional geographic characteristics of the man-made structures or the natural structures.

In some embodiments, the location information may further include risk information of the location. The risk information may define risk characteristics of the location.

In some embodiments, the location information may further include environmental information of the location. The environmental information may define environmental characteristics of the location.

In some embodiments, the three-dimensional view of the route may include a first-person perspective of the route or a third-person perspective of the route.

In some embodiments, the interface may enable changes to the route within the location.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
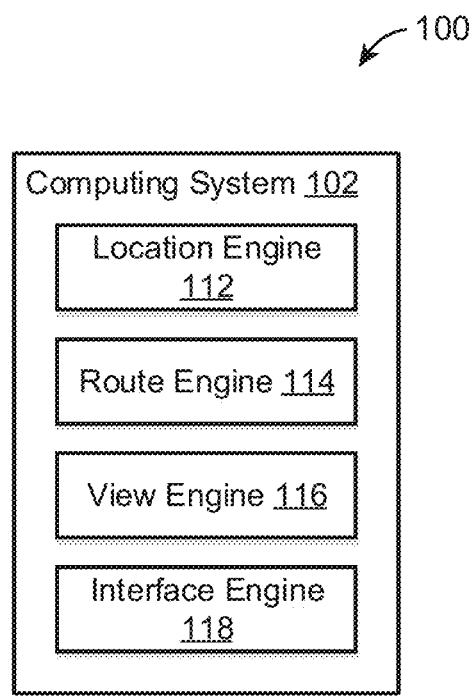
FIG. 1 illustrates an example environment for providing three-dimensional representations of routes, in accordance with various embodiments.

A claimed solution rooted in computer technology overcomes problems specifically arising in the realm of computer technology. In various implementations, a computing system may obtain location information for a planned movement. The location information may include tridimensional information of a location. The computing system may obtain route information for the planned movement. The route information may define a route of one or more entities (e.g., one or more persons, teams, vehicles) within the location. The computing system may determine a three-dimensional view of the route within the location based on the location information and the route information. The computing system may also provide an interface through which the three-dimensional view of the route within the location is accessible. The three-dimensional view of the route (e.g., first-person perspective of the route, third-person perspective of the route) may enable a user to obtain a more thorough understanding of the route and the location than would be obtained from viewing the route on a two-dimensional representation of the location. The three-dimensional view of the route may include use of transparency for one or more structures/things within the location to enable a view of the entire location along with the route.

In some embodiments, the three-dimensional view of the route may be accessed through immersive graphical applications, such as a virtual reality application, an augmented reality application, and/or a mixed reality application. For example, a user may interact with a virtual reality application to select a virtual representation of the planned movement to see and interact with the three-dimensional view of the route. The virtual reality application may enable the user to see the route from varying points of view. For example, the user may see the entire route within the location using a world view or experience a simulation of the route in a first-person perspective.

In some embodiments, the tridimensional information may define three-dimensional geographic characteristics of the location. For example, the location may include one or more man-made structures and/or natural structures, and the tridimensional information may define three-dimensional geographic characteristics (e.g., shape, length, width, height) of the man-made structures and/or the natural structures. The location may include one or more entities and/or things within or on the structures, and the tridimensional information may define the positions (e.g., longitude, latitude, height, orientation) of the entities and/or things within or on the structures.

In some embodiments, the location information may further include risk information of the location. The risk information may define risk characteristics of the location. For example, a particular area, entity, or thing within the location may be associated with a certain risk and the risk information may define the level and/or the type of risk for the area, entity, or thing.

In some embodiments, the location information may further include environment information of the location. The environmental information may define environmental characteristics of the location. For example, the location may have certain environmental conditions (e.g., weather, lighting) and the environmental information may define the level and/or the type of environmental conditions of the location.

In some embodiments, the interface may enable changes to the route within the location. For example, the three-dimensional view of the route provided by the interface may enable a user to analyze the route based on three-dimensional geographic characteristics, risk characteristics, and/or environmental characteristics of the location and enable the user to make changes to the route. For example, the route may be changed to reduce the risk to an entity using the route and/or to help the entity avoid environmental obstacles along the route or at the location (e.g., avoid being blinded by the light).

The approaches disclosed herein enables views of three-dimensional representations of routes. Tridimensional information of a location (e.g., three-dimensional geographic characteristics of the location) and route information of a route within the location may be taken into account to determine a three-dimensional view of the route within the location for one or more entities. Additional information about the location, such as information relating to risks and/or environmental factors in the location, may be used to augment the three-dimensional view of the route. Such views of a route may enable one or more entities using the route and/or other user(s) to see the route in context of the environment through which the route passes and to see the features of the route that may not be observable and/or may be difficult to perceive from a view of the route on a two-dimensional representation of the location.

While the disclosure is described herein with respect to routes for emergency responders, there is merely for illustrative purposes and is not meant to be limiting. The approach disclosed herein may be used to providing three-dimensional representations of routes for other entities and/or other types of use.

FIG. 1 illustrates an example environment 100 for providing three-dimensional representations of routes, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a location engine 112, a route engine 114, a view engine 116, an interface engine 118, and/or other engines. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple computing devices.

In various embodiments, the location engine 112 may be configured to obtain location information for a planned movement. Obtaining location information may include accessing, acquiring, analyzing, determining, examining, loading, locating, opening, receiving, retrieving, reviewing, storing, and/or otherwise obtaining the location information. For example, the location engine 112 may, based on a planned movement selected by a user, search for and/or obtain location information for one or more locations associated with the planned movement. Location information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Location information may be obtained from one or more databases. Location information may be stored within a single file or across multiple files. For example, location information for a planned movement may have been ingested into a database as one or more objects, and the location engine 112 may retrieve the object(s) to obtain the location information.

Location information for a planned movement may include information regarding one or more locations associated with the planned movement. A planned movement may refer to an arranged/designed change in a position/physical location of one or more entities. For example, a planned movement may include a future change in a position/physical location of persons, teams, vehicles, and/or other things. A location for a planned movement may refer to a geographic location or area within which one or more of the entities may move. For example, a planned movement may include an arrangement for a person to move from a starting point to an ending point. The planned movement may include one or more waypoints for the person to move through between the starting point and the ending point. A location for a planned movement may include one or more geographic areas that contain the starting point, the ending point, the waypoint(s), and/or points in between. A location for a planned movement may include surroundings (e.g., lateral surroundings, vertical surroundings) of such areas.

Location information for a planned movement may include tridimensional information of one or more locations. Tridimensional information may define three-dimensional geographic characteristics of the location(s). Tridimensional information may define physical characteristics of the location(s). For example, a location may include one or more of man-made structures, natural structures, and/or other structures, and the tridimensional information for the location may define three-dimensional geographic characteristics (e.g., shape, length, width, height) of the man-made structures, the natural structures, and/or other structures. The tridimensional information for the location may define internal dimensions and/or outer dimensions of structures. The tridimensional information for the location may define properties of structures, such as identities, internal compositions, surface qualities, and/or other properties of structures. As another example, a location may include one or more entities and/or things within or on the structures, and the tridimensional information may define the positions (e.g., longitude, latitude, height, orientation) of the entities and/or things within or on the structures. The tridimensional information for the location may define internal dimensions and/or outer dimensions of entities and/or things (e.g., outer and internal dimensions of a vehicle). The tridimensional information for the location may define properties of entities and/or things, such as their identities, compositions of things, equipment/ tools carried by the entities and/or things, skills/responsibilities of entities, and/or other properties of entities and/or things.

In some embodiments, the location information may include risk information and/or difficulty information of one or more locations. The risk information may define risk characteristics of the location(s). The difficulty information may define difficulty characteristics of the location(s). A risk/difficulty characteristic may refer to one or more characteristics that relate to a risk/difficulty associated with moving within a location. For example, a particular area, entity, and/or thing within the location may be associated with a certain risk and the risk information may define the level and/or the type of risk for the area, entity, and/or thing. For instance, a particular building may have structural problems and the risk information may define the risk characteristics of the building, such as the type of risk posed by the building (e.g., pieces of the building falling off, one or more portions of the building failing/crumbling) and the level of such risk (e.g., numeric and/or categorical level of risk). Or, as another instance, an entity may pose a risk to the entity and/or others within the vicinity of the person, such as the entity being in the danger of falling from a high location, and the risk information may define the risk characteristics of the entity, such as the type of risk posed by the entity (to the entity and/or others) and the level of such risk.

A risk/difficulty characteristic may be general to the location (e.g., same risk/difficulty to different entities moving within the location) or specific to one or more entities (e.g., different risk/difficulty to different entities moving within the location). A risk/difficulty characteristic of a location may be static (e.g., does not change over time) or dynamic (e.g., changes over time). For example, risk/difficulty characteristics of moving within a location may change based on the season, weather conditions, and/or other factors. As another example, the risk/difficulty characteristics for moving within a location may change based on occurrences of one or more events, proximity of particular entities/groups within/near the location, and/or other information. For example, a particular risk/difficulty characteristic of a location may exist based on occurrence of an event (e.g., snowfall, landslide, accident). In such embodiments, risk/ difficulty type and/or level may depend on spatial and/or temporal aspects of the location. For example, the risk of moving within a location may change based on a recent landslide or an accident (e.g., vehicular accident, power outage, etc.). The risk within the location due to such events may change over time. The risk within the location due to such events may be localized or may spread out to other areas. The risks due to such events may be projected in time and/or space based on one or more propagation/diffusion functions (e.g., linearly, quadratically, over a given duration of time). The changes in risk (over time and/or space) may be different based on identities of the entities (e.g., risk to civilians increases more than risk to emergency responders).

In some embodiments, the location information may include environmental information of one or more locations. The environmental information may define environmental characteristics of the location(s). An environmental characteristic may refer to one or more characteristics that relate to environmental conditions within a location. For example, a location may have certain environmental conditions (e.g., weather, lighting) and the environmental information may define the level and/or the type of environmental conditions of the location. An environmental characteristic may be general to the location or specific to one or more entities. An environmental characteristic of a location may be static (e.g., does not change over time) or dynamic (e.g., changes over time).

In various embodiments, the route engine 114 may be configured to obtain route information for the planned movement. Obtaining route information may include accessing, acquiring, analyzing, determining, examining, loading, locating, opening, receiving, retrieving, reviewing, storing, and/or otherwise obtaining the route information. For example, the route engine 114 may, based on a planned movement selected by a user, search for and/or obtain route information for one or more routes associated with the planned movement. Route information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Route information may be obtained from one or more databases. Route information may be stored within a single file or across multiple files. For example, route information for a planned movement may have been ingested into a database as one or more objects, and the route engine 114 may retrieve the object(s) to obtain the route information.

Route information may define one or more routes of one or more entities (e.g., one or more persons, teams, vehicles) within the location. A route of a planned movement may refer to one or more paths/courses that may be used by one or more entities to move from one or more starting points to one or more ending points. For example, a planned movement may include movement of multiple entities that may start from the same starting point or different starting points and/or end at the same ending point or different ending points. A planned movement may include one or more routes for one or more entities to move from the starting point(s) to the ending point(s). The route(s) may include one or more waypoints. Route information including multiple routes for multiple entities may be used to provide for coordination of movement of multiple entities (e.g., coordinate multiple entities reaching one or more locations at the same time/at particular times). A route may be static (does not change with time, conditions, variables, etc.) or may by dynamic (changes with time, conditions, variables, etc.).

A path/course of a route may include changes in lateral position and/or changes in vertical position of one or more entities. The change in positions defined by the route may be associated with time information. For instance, a particular route to be taken by an entity in a location may be timed such that different positions within the route are associated with different times (e.g., a starting position of an entity associated with an expected starting time, an ending position of the entity associated with an expected ending time).

Obtaining route information may include obtaining previously determined and/or stored route information and/or determining route information. The route engine 114 may obtain route information that has been determined and/or stored in one or more storage locations. The route engine 114 may obtain information relating to a route and determine the route information. For example, the route engine 114 may obtain information relating to one or more locations, one or more points within a location between which entit(ies) may move, such as a starting point, an ending point, and one or more waypoints in between the starting point and the ending point, and/or other information to determine the route information. The route information may include a single route or multiple routes within the location. For instance, determining the route information may include determining a route that has the best characteristic(s), such as the fastest route, shortest route, or the least risky route. Determining the route information may include determining one or more routes with a particular combination of characteristics, such as routes meeting one or more criteria relating to time of the route, distance of the route, riskiness of the route, and/or other characteristics relating to the route. For instance, multiple routes that meet a user-specified criteria relating to routes may be determined and provide to a user for selection. The determined route information may be changed. For example, one or more routes defined by the route information may change based on in user input (e.g., a user's changing, insertion, and/or removal of starting point, ending point, and/or waypoints), changes in circumstances relating to the route (e.g., changes in geographic, risk, difficulty, and/or environmental characteristics of the location, changes in entit(ies) using the route), and/or other information.

In some embodiments, a route for a planned movement may include contingency based on changes in circumstances. Use of contingency for a route may provide for different routes/paths/courses based on changes in circumstances. For example, route information may define different/optional paths/courses depending on one or more contingencies occurring before or while using the route, such as one or more events/activities (that occur prior to or during usage of the route), one or more route properties/conditions (e.g., different paths/courses based on whether a certain path/course is accessible or not, different paths/courses based lighting/weather conditions during usage of the route), and/or other information for the route. For example, a route may include optional paths/courses based on one or more properties/conditions of the route (e.g., time/season at which the route is used, weather/lighting conditions during which the route is used, etc.). As another example, a route may include optional paths/courses based on identities of entities using the route.

Use of a contingency for a route may provide for different/optional paths/courses for a single entity or multiple entities. For example, a route may be planned for two entities. In this example, a contingency for the route may provide for a different path/course to be taken by one of the entities based on how the other entity uses the route. As another example, a route may be determined for multiple entities. In this example, a contingency for a route may provide for different paths/courses to be taken by the different entities based on occurrences of one or more events. Other uses of contingencies are contemplated.

In some embodiments, a route may include multiple modes of motion along the route. For example, a route may include one or more paths/courses (or one or more portions) that are to be traveled using different mode(s) of motion (e.g., walking, climbing, rappelling, driving, riding a train/bus, biking, flying, swimming, etc.) from other paths/courses (or one or more other portions). The usage of different modes of motion may be provided as an option for one or more entities using the route (e.g., different paths/courses based on the mode of motion used). The mode(s) selected may be determined based on a user-selection (e.g., a user selecting a given mode of motion for a particular portion of a route using a user interface), may be determined based on availability of the modes of motion, and/or based on other information.

In various embodiments, the view engine 116 may be configured to determine a three-dimensional view of a route within a location based on location information, route information, and/or other information. A three-dimensional view of a route may refer to a view of one or more portions of the route that includes a three-dimensional representation of the location along the route. That is, the view engine 116 may determine a three-dimensional representation of a given location through which the route travels and may provide a view of the route using the three-dimensional representation of the location. The view of the route may include three-dimensional objects shaped based on three-dimensional geographic characteristics of the location. The view of the route may include other information/three-dimensional objects generated based on risk characteristics, difficulty characteristics, and/or environmental characteristics of the location.

A three-dimensional view of a route may be determined (e.g., generated) using one or more three-dimensional graphics rendering engines (e.g., WebGL, Unity). In some embodiments, custom/general map tiles may be used to render a three-dimensional map of a location in three-dimensional space. The three-dimensional rendering can include three-dimensional representations (e.g., 3D objects) of structures, entities, and/or things within the location. Use of other engines (e.g., physics engine, animation engine, scripting engine) are contemplated.

In some embodiments, the view engine 116 may determine a three-dimensional view of a route within a location using one or more transparencies and/or different renderings for structures, entities, and/or things within the location. For instance, a three-dimensional view of a route may include use of transparency (e.g., wireframe render) for one or more structures/things within the location to enable a view of the entire location along with the route. That is, rather than rendering structures/things using opaque rendering, three-dimensional objects may be generated as partially/fully transparent so that the route is not hidden from view by representations of structures/things within the location. In some embodiments, different textures/colors may be used to render different objects to indicate different qualities of the objects. For instance, a particular texture/color may be used to represent a property of the object, such as the identity of the object, the composition of the object, the risk posed by the object, the role of the object (e.g., whether the object represents an entity using a route and/or a goal of the route), and/or other characteristics of the object.

In some embodiments, a three-dimensional view of the route may include a first-person perspective of the route and/or a third-person perspective of the route. That is, the three-dimensional view of a route generated by the view engine 116 may allow for presentation of different types of views (e.g., presentation of multiple types of view at the same time, switching between different types of view). A first-person perspective of the route may include a view of the route as would be seen from an entity within the location. For example, a first person perspective of the route may enable a user to see the route/location as would be seen from an entity using the route, an entity within the location, and/or other entities. A third-person perspective of the route may include a view of the route as would be seen from an entity not within the location. That is, a third-person perspective of the route may include a view of the route as would be seen from a virtual entity (e.g., virtual camera) within the location. For example, a third person perspective of the route may enable a user to visualize the route/location as would be seen from a virtual camera that is following an entity using the route, an entity within the location, and/or other entities. For instance, a third person perspective of the route may include an over-the-shoulder perspective of the route that follows an entity and is positioned above, behind, and/or to the right/left of the entity. In another example, a third person perspective of the route may include an overview perspective of the route that positions the virtual camera above the three-dimensional representation of the location.

A three-dimensional view of a route within a location may include presentation of information relating to the route and/or location. For example, a first-person perspective and/or a third-person perspective of the route may include information overlaid on top of the three-dimensional representations within the view. The overlaid information may include general information relating to the route/location and/or specific information relating to the portion of the route/location in view. For instance, one third-person perspective of a route may include information describing the starting point, the ending point, time duration of the route, and/or other general information about the route/location while another third-person perspective of the route may include information specific to what is contained within the third-person perspective of the route, such as information relating to structures, entities, and/or things within the view.

The three-dimensional rendering of the route may be generated based on and/or before access of the three-dimensional view of a route for presentation on a display. Generating the three-dimensional rendering based on access may enable the view engine 116 to only render those portions of the route that are being accessed for use. Generating the three-dimensional rendering before access may enable the view engine 116 to have the three-dimensional rendering ready for viewing and can allow for quicker viewing of the three-dimensional rendering of the route by users. The three-dimensional rendering of the route may be stored in memory for later use.

In various embodiments, the interface engine 118 may be configured to provide one or more interfaces through which a three-dimensional view of a route is accessible. The interface(s) may include application programming interface(s) (APIs) and/or user interface(s). For example, the interface engine 118 may provide one or more APIs that may be used by users/computing systems to access a three-dimensional view of a route. As another example, the interface engine 118 may provide one or more user interfaces (e.g., web user interface accessible through a browser) through which users may view a three-dimensional view of a route.

In some embodiments, a three-dimensional view of a route may be accessed through a three-dimensional graphical application, such as a three-dimensional rendering application. In some embodiments, the three-dimensional view of the route may be accessed through immersive graphical applications, such as a virtual reality application, an augmented reality application, and/or a mixed reality application. In some instances, such immersive graphical applications may run in conjunction with specialized computer hardware (e.g., a virtual reality headset). An immersive graphical application may simulate a three-dimensional view of the route as if the user were located within the location. For example, a user may interact with a three-dimensional rendering application/immersive graphical application to select a three-dimensional representation of the planned movement to see and interact with the three-dimensional view of the route. The three-dimensional rendering application/immersive graphical application may enable to user to see the route from varying points of view. For example, the user may see the entire route within the location using a world view or experience a simulation of the route in a first-person perspective.

In some embodiments, the interface(s) may enable changes to the route within the location. For example, a three-dimensional view of the route provided by the interface(s) may enable a user to analyze the route based on three-dimensional geographic characteristics, risk characteristics, difficulty characteristics, and/or environmental characteristics of the location and enable the user to make changes to the route. For example, the route may be changed to reduce the risk to an entity using the route and/or to help the entity avoid environmental obstacles in the location (e.g., avoid being blinded by the light). As another example, the route may be changed to include different modes of motion along the route for one or more entities. For instance, a three-dimensional view of the route may prompt a user to change the mode of motion for an entity for a portion of the route from one mode of motion (e.g., driving a vehicle) to another mode of motion (e.g., walking). The interface(s) may enable a user to step through the route and experience a simulation of the route in three-dimensions, which may facilitate the user's understanding of the route and/or detection of problems with the route. The interface(s) may enable a user to view and/or interact with location information (e.g., tridimensional information), view and/or add other information (e.g., annotation) to the three-dimensional view of the route.

Figure 2:
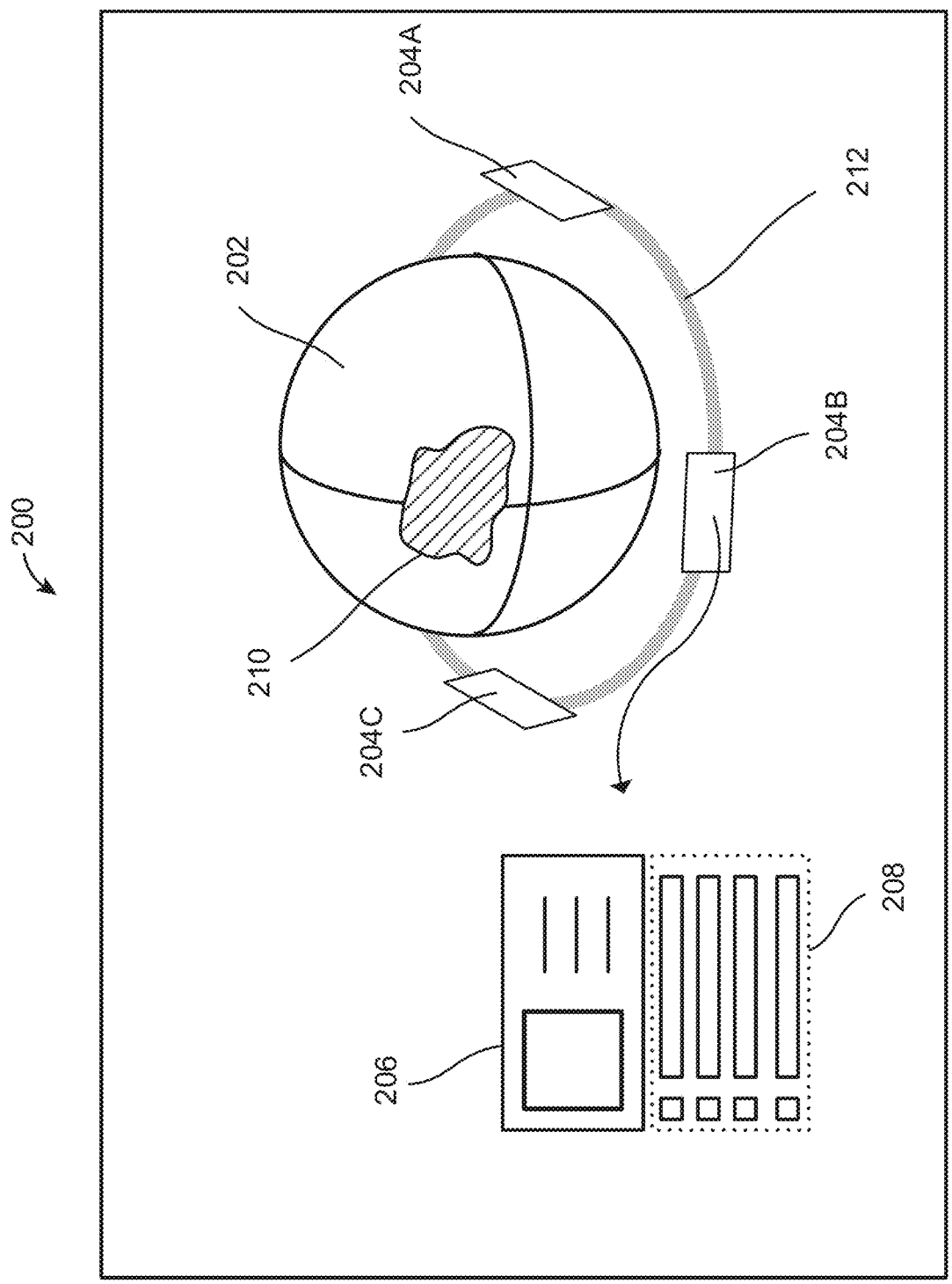
FIG. 2 illustrates an example interface for providing three-dimensional representations of routes, in accordance with various embodiments.

FIG. 2 illustrates an example interface 200 for providing three-dimensional representations of routes, in accordance with various embodiments. In various embodiments, the interface 200 may be accessed through a software application running on a computing device (e.g., computers, mobile phones, tablets, etc.) that includes one or more processors and memory. For example, the interface 200 may be accessible through a web browser. In another example, the interface 200 may be provided through a data analysis application, a three-dimensional graphical application, and/or an immersive graphical application. In yet another example, the interface 200 may be provided as a service over a network (e.g., software as a service). Depending on the computing device, the user may be able to interact with the interface 200 using various input devices (e.g., keyboard, mouse, etc.) and/or touch gestures. The interface 200 is provided merely as an example and, naturally, the arrangement and configuration of such user interfaces can vary depending on the implementation. Thus, depending on the implementation, the interface 200 may include additional features and/or alternative features.

The interface 200 may include a globe object 202, card objects 204, 206, and an information object 208. Presentation of other objects are contemplated. The globe object 202 may represent the earth. A user may interact with the interface 200 and/or the globe object 202 to see different parts of the globe object 202. For example, the interface 200 may be presented through a three-dimensional graphical application and the user may interact with one or more input devices (e.g., keyboard, mouse) and/or touch gestures to move/rotate the globe object 202. As another example, the interface 200 may be presented through an immersive graphical application (e.g., VR, AR, MR) and the user may move/rotate the globe object 202 within the immersive graphical application (e.g., via hand controllers, touch gestures). For instance, the user may place one or more control markers on the globe object 202 and spin the globe object 202 by moving one or more controllers in the real-world.

The card objects 204A, 204B, 204C may be associated with one or more locations represented on the globe object 202, one or more planned movements within location(s) represented on the globe object 202, and/or one or more routes within location(s) represented on the globe object 202. The card objects 204A, 204B, 204C may be arranged along a circular track 212 and may be repositioned virtually based on interactions of a user with the circular track 212, the globe object 202, and/or the card objects 204A, 204B, 204C.

The selection of the card objects 204A, 204B, 204C may prompt additional information relating to the corresponding location(s), planned movement(s), and/or route(s) to be presented on the interface 200. For instance, a user may select the card object 204B, for example, by clicking on the card object 204B with a cursor, or by grabbing and bringing the card object 204B closer to the virtual position of the user and/or in front of the virtual position of the user and/or towards a user viewport. The selection of the card object 204B may result in presentation of the card object 206. The card object 206 may include a larger version of the card object 204B. The card object may present the same information as the card object 204B, or different information (e.g., more detailed information) compared to the card object 204B. A user may de-select the card object 204B by placing the card object 204B back on the circular track 212, releasing the card object 204B (e.g., which may automatically move back to its position on the circular track 212), and/or otherwise de-selecting the card object 204B.

Responsive to the user's selection of the card object 204B, the globe object 202 may turn to present the relevant information (e.g., location(s)) to the user. Responsive to the user's selection of the card object 204B, a portion 210 of the globe object 202 may be display differently. For example, the portion 210 of the globe object 202 may be highlighted, may be presented with additional information, may be presented with more detailed information, and/or may be otherwise presented differently than when the card object 204B had not been selected. Responsive to the user's selection of the card object 204B, additional information relating to the corresponding location(s), planned movement(s), and/or route(s) may be presented within the information object 208. For example, the information object 208 may provide information relating to an entity (or entities) involved in the planned movement, characteristics of the location(s)/route(s) of the planned movement, a history log, and/or other information. In some embodiments, a user may be able to select multiple card objects 204 for comparison (e.g., grabbing the card object 204B and the card object 204C to see additional/close-up information presented on the card objects 204B, 204C).

Figure 3:
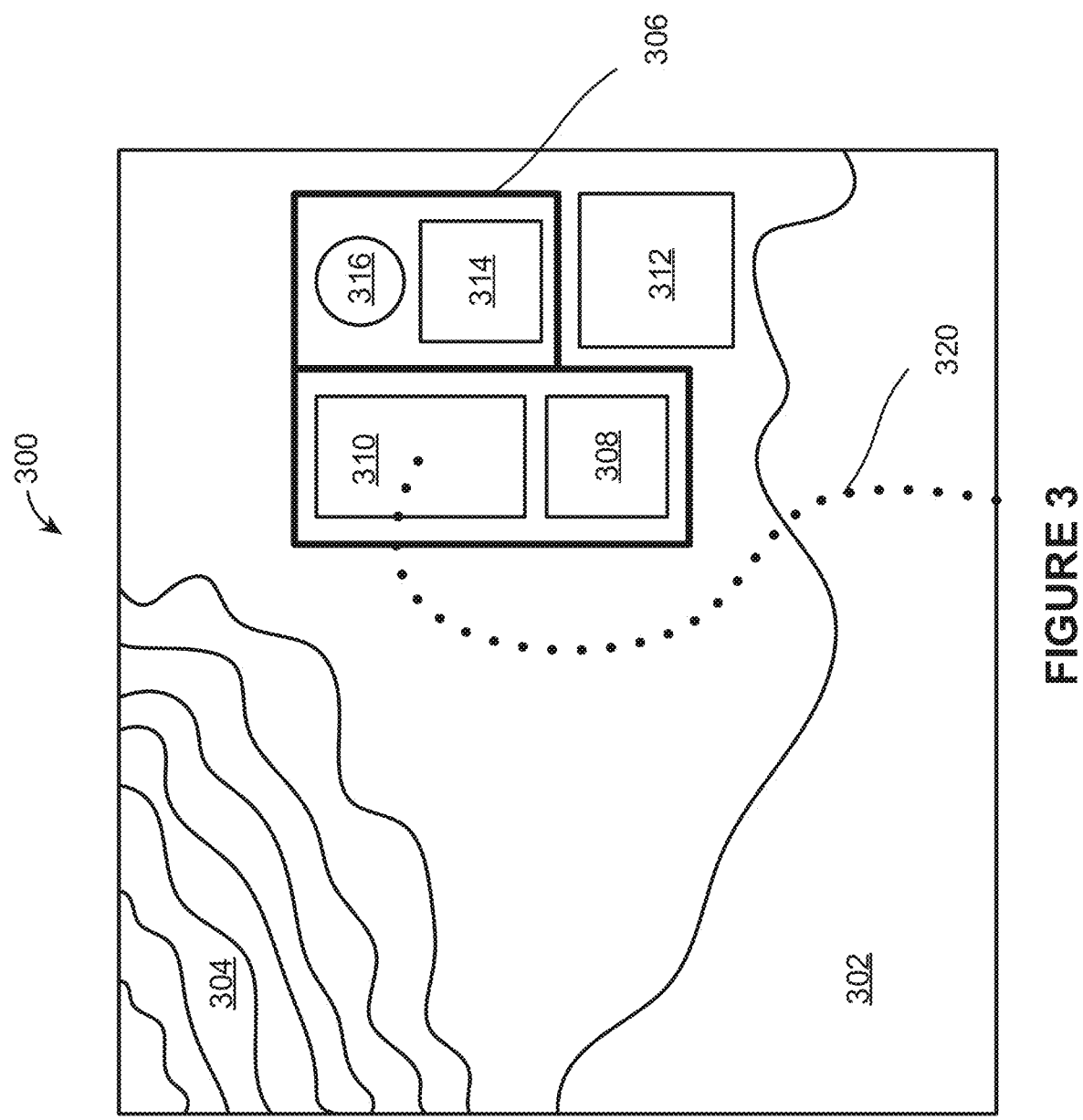
FIG. 3 illustrates an example two-dimensional representation of a route, in accordance with various embodiments.

FIG. 3 illustrates an example two-dimensional representation 300 of a route, in accordance with various embodiments. In various embodiments, the two-dimensional representation 300 may be accessed through a software application running on a computing device (e.g., computers, mobile phones, tablets, etc.) that includes one or more processors and memory. For example, the two-dimensional representation 300 may be accessible through a web browser. In another example, the two-dimensional representation 300 may be provided through a data analysis application, a three-dimensional graphical application, and/or an immersive graphical application. In yet another example, the two-dimensional representation 300 may be provided as a service over a network (e.g., software as a service). Depending on the computing device, the user may be able to interact with the two-dimensional representation 300 using various input devices (e.g., keyboard, mouse, etc.) and/or touch gestures. The two-dimensional representation 300 is provided merely as an example and, naturally, the arrangement and configuration of such user interfaces can vary depending on the implementation. Thus, depending on the implementation, the two-dimensional representation 300 may include additional features and/or alternative features.

The two-dimensional representation 300 of the route may include a two-dimensional representation of a location (e.g., map) including a body of water 302, a mountain region 304, roads 306, buildings 308, 310, 312, 314, 316, and a route 320. The route 320 may include a path/course that may be used by one or more entities to move from a starting point to an ending point (e.g., to/on top of the building 310). For example, the route 320 may include a path/course that includes movement of an entity in the air (e.g., flying, gliding, parachuting). A user of the two-dimensional representation 300 of the route (e.g., the entity that is to use the route 320, an entity coordinating the planned movement) may find it difficult visualize the usage of the route 320, visualize what obstacles might be encountered in using the route 320, remember features of the location that may assist with using the route 320, and/or otherwise understand the route 320 and/or the location.

Figure 4:
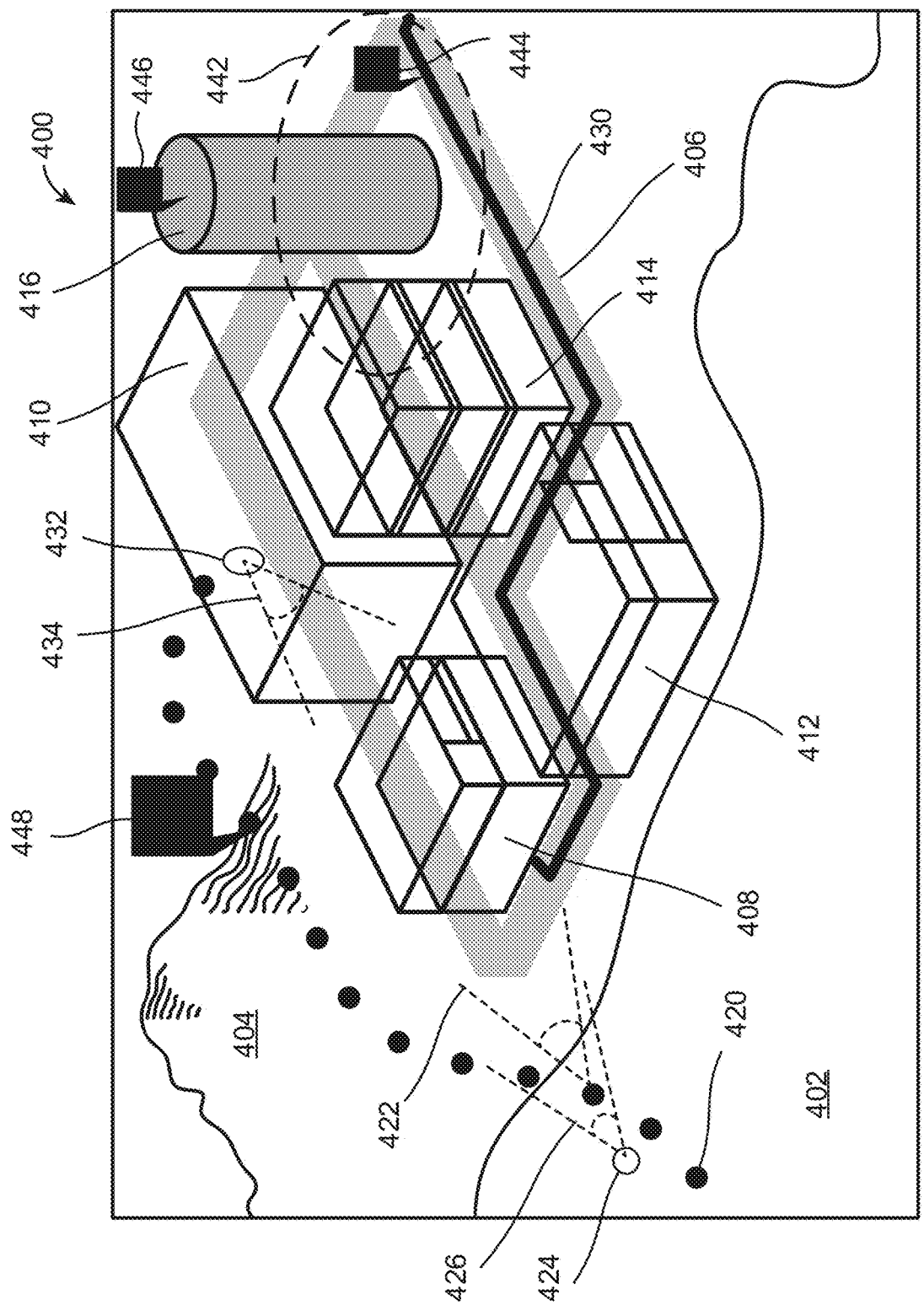
FIG. 4 illustrates an example three-dimensional representation of a route, in accordance with various embodiments.

FIG. 4 illustrates an example three-dimensional representation 400 of a route, in accordance with various embodiments. In various embodiments, the three-dimensional representation 400 may be accessed through a software application running on a computing device (e.g., computers, mobile phones, tablets, etc.) that includes one or more processors and memory. For example, the three-dimensional representation 400 may be accessible through a web browser. In another example, the three-dimensional representation 400 may be provided through a data analysis application, a three-dimensional graphical application, and/or an immersive graphical application. In yet another example, the three-dimensional representation 400 may be provided as a service over a network (e.g., software as a service). Depending on the computing device, the user may be able to interact with the three-dimensional representation 400 using various input devices (e.g., keyboard, mouse, etc.) and/or touch gestures. The three-dimensional representation 400 is provided merely as an example and, naturally, the arrangement and configuration of such user interfaces can vary depending on the implementation. Thus, depending on the implementation, the three-dimensional representation 400 may include additional features and/or alternative features.

The three-dimensional representation 400 of the route may include a three-dimensional representation of a location (e.g., three-dimensional representations of three-dimensional structures) with routes 420, 430 overlaid over the three-dimensional representation. For example, the three-dimensional representation 400 may include three-dimensional objects representing a mountain (e.g., a mountain object 404), buildings (e.g., building objects 408, 410, 412, 414, 416), and/or other three-dimensional objects. The three-dimensional representation 400 may include two-dimensional objects and/or textures of three-dimensional objects representing a body of water (e.g., a water object/texture 402), a road (e.g., a road object/texture 406), and/or other objects. The routes 420, 430 may include paths/courses that may be used by one or more entities to move from starting points to ending points (e.g., to/on top of the building 410, to/in front of the building 408). For example, the route 420 may include a path/course that includes movement of an entity in the air (e.g., flying, gliding, parachuting). A user of the three-dimensional representation 400 of the route (e.g., the entity that is to use the route 420, an entity coordinating the planned movement) may find it easier to visualize the usage of the route 420, visualize what obstacles might be encountered in using the route 420, remember features of the location that may assist with using the route 420, and/or otherwise understand the route 420 and/or the location than if the user were using a two-dimensional representation of the route (e.g., the two-dimensional representation 300 shown in FIG. 3). That is, three-dimensional views of the route enabled by the three-dimensional representation 400 of the route may enable a user to obtain a more thorough understanding of the route 420 and the location than would be obtained from viewing the route on a two-dimensional representation of the location.

Such representations of the route may enable a user of the three-dimensional representation to see the route (e.g., the routes 420, 430) in the context of the environment through which the route passes and to see the features of the route that may not be observable and/or may be difficult to perceive from a view of the route on a two-dimensional representation of the location. For example, a user may see the entire routes 420, 430 within the location using a world view and/or experience a simulation of the route in a first-person perspective and/or a third-person perspective. For example, a user using a world view may be able to see the three-dimensional representation 400 from any distance (e.g., far away, up-close). A user using a world view may be able to see different portions of the three-dimensional representation 400 from different angles by interacting with the three-dimensional representation 400 (e.g., pushing it, pulling it, rotating it, moving closer to it, moving away from it).

As another example, a user may see the route 420 using a field of view 422, a field of view 426, a field of view 434, and/or other views. The field of view 422 may correspond to a viewing field of view (first-person perspective) of an entity using the route 420. The field of view 426 may correspond to a viewing field of view (third-person perspective) of a virtual camera 242 position behind, above, and/or to the left of the entity using the route 420. The field of view 434 may correspond to a viewing field of view of an entity (e.g., person) 432 located in/on top of the building 410. For example, the entity using the route 430 may include an emergency responder and the entity located in/on top of the building 410 may include a person who needs help.

Using the field of view 422 may enable a user to experience a simulation of what it would be like to approach the building 410 via air. For example, a user using the field of view 420 may get an estimate of when/where along the route 420 the person to be rescued will be visible. Using the field of view 426 may enable a user to experience a simulation of what it would be like to see one or more entities approaching the building 410 via air. For example, a coordinator of the planned movement may be able to observe simulation of one or more emergency responders using the route 420. Using the field of view 434 may enable a user to experience a simulation of what it would be like to be the person to be rescued. For example, a user using the field of view 434 may be able to see when/where the person to be rescued will have a direct line of sight of the emergency responder(s) using the route 420. In some embodiments, multiple perspectives of view may be presented at once. For example, a user may use the field of view 422 to see a first person perspective of using the route 420 and use another field of view to see a different perspective that he same time. In some embodiments, multiple views of the same perspective may be provided to multiple users.

In some embodiments, the three-dimensional representation of the route 400 may facilitate simulation of one or more characteristics of the planned movement, the location(s), and/or the route(s). For example, the three-dimensional representation of the route 400 may facilitate simulation of geographic characteristics, the risk characteristics, and/or environmental characteristics of the location. For instance, the three-dimensional representation of the route 400 may facilitate simulation of an entity moving on the ground along the route 430, and experience a simulation of what it would be like to approach the building 408 from the ground (e.g., see shapes and sizes of buildings 412, 414, 416 along the way). Evaluations of vertical and lateral distances and timing within the location may be important factors in determine the suitability of the route 430. For example, if the route 430 comes too close to a building, the route 430 may be changed to get the entity (or entities) using the route 430 away from the building. As another example, an entity (or entities) using the route 430 may be better prepared by experience simulations of the route 430 that simulates how long it may take to get from one point in the location to another point in the location.

The three-dimensional representation of the route 400 may include information that provides the risk level and/or type of particular portions of the location. For instance, the building represented by the building object 416 may be unstable and the building object 416 may be rendered differently (e.g., different transparency, color, and/or texture) from other building objects 408, 410, 412, 414 to indicate the instability. Additionally, the risk posed by the building (e.g., pieces of the building falling off, one or more portions of the building failing/crumbling) may be projected in the three-dimensional representation of the route 400 (e.g., risky area 442). For instance, the size and/or the shape of the risk area 442 may be determine based on a calculation of ranges of falling debris from the building and the risky area 442 may be visualized to alert a user as to when a route enters and/or comes close to the risky area 442. A user of the three-dimensional representation 400 may use this information to decide to change the route 430 such that the route 430 does not enter/come close to the risky area 442.

Obstacles (e.g., environmental obstacles) of using the routes 420, 430 may similarly be presented using the three-dimensional representation 400. For example, a user using a first-person perspective view may simulate usage of the route 420 at different times of the day to see when visibility may be acceptable/unacceptable, to understand when it may be possible to avoid and/or take advantage of direct sunlight/shadows. As another example, a user using the route 420 may be presented with one or more simulations of what it might be like to use the route 420 during inclement weather conditions (e.g., poor visibility due to rain/snow, being shaken/pushed off the route 420 via wind).

In some embodiments, information relating to the planned movement, the location(s), and/or the route(s) may be displayed as annotations. For example, information may be placed within markers 444, 446, 448 to provide information relating to one or more specific portions of the planned movement, the location(s), and/or the route(s). Use of markers 444, 446, 448 may facilitate certain information to be called out for the specific portion(s). For example, the marker 444 may provide information about the portion of the route 430 within the risky area 442. The marker 446 may provide information about the building represented by the building object 416. The marker 448 may provide information about a portion of the route 420.

In some embodiments, information about the planned movement, the location(s), and/or the route(s) may be used to augment views of the three-dimensional representation 400. For example, a view of the three-dimensional representation may include information relating to features, properties, and/or characteristics of the planned movement, the location(s), and/or the route(s) that are not inherent from the view. For instance, a view of the route 420 may be augmented with information relating to expected speed of a person using the route 420 and/or remaining duration/distance remaining in the route 420. As another example, a view of the building object 416 may be augmented with information on structural integrity of the building, the type of risk posed by the building, and/or the risk level of the building. As further example, a view of the entity 432 may be augmented with information on identity of the entity, the status of the entity, and/or other information about the entity.

The three-dimensional representation 400 may be used before the usage of the routes 420, 430, during the usage of the routes 420, 430, and/or after the usage of the routes 420, 430. The three-dimensional representation 400 may be used before the usage of the routes 420, 430 to simulate how the routes 420, 430 may be used or simulate experience of using the routes 420, 430. The three-dimensional representation 400 may be used during the usage of the routes 420, 430 to show a comparison of the planned version of the routes 420, 430 versus how the entity or entities are actually using the route 420, 430. For example, the position of the entity or entities (determined using GPS information) may be overlaid on the three-dimensional representation 400 to see how closely the entity or entities are following the route 420, 430. Such presentation of present positions of entity or entities may be augmented with other information, such as notification of when the entity or entities are approaching the risky area 442 and/or a presentation of information relating to timed objectives to see whether the entity or entities are on early, on-time, or behind schedule. Such a view may enable coordination of multiple entities using the routes 420, 430. For example, a coordinator use such views to help the entities get back on schedule (e.g., instruct an entity to slow down to match progress of other entities, instruct an entity to speed up to catch up to other entities). The three-dimensional representation 400 may be used after the usage of the routes 420, 430 to see/review how the entity or entities actually used the routes 420, 430. Such a view may include a timeline view that enables a user to view when and where events occurred during usage of the routes 420, 430.

Figure 5:
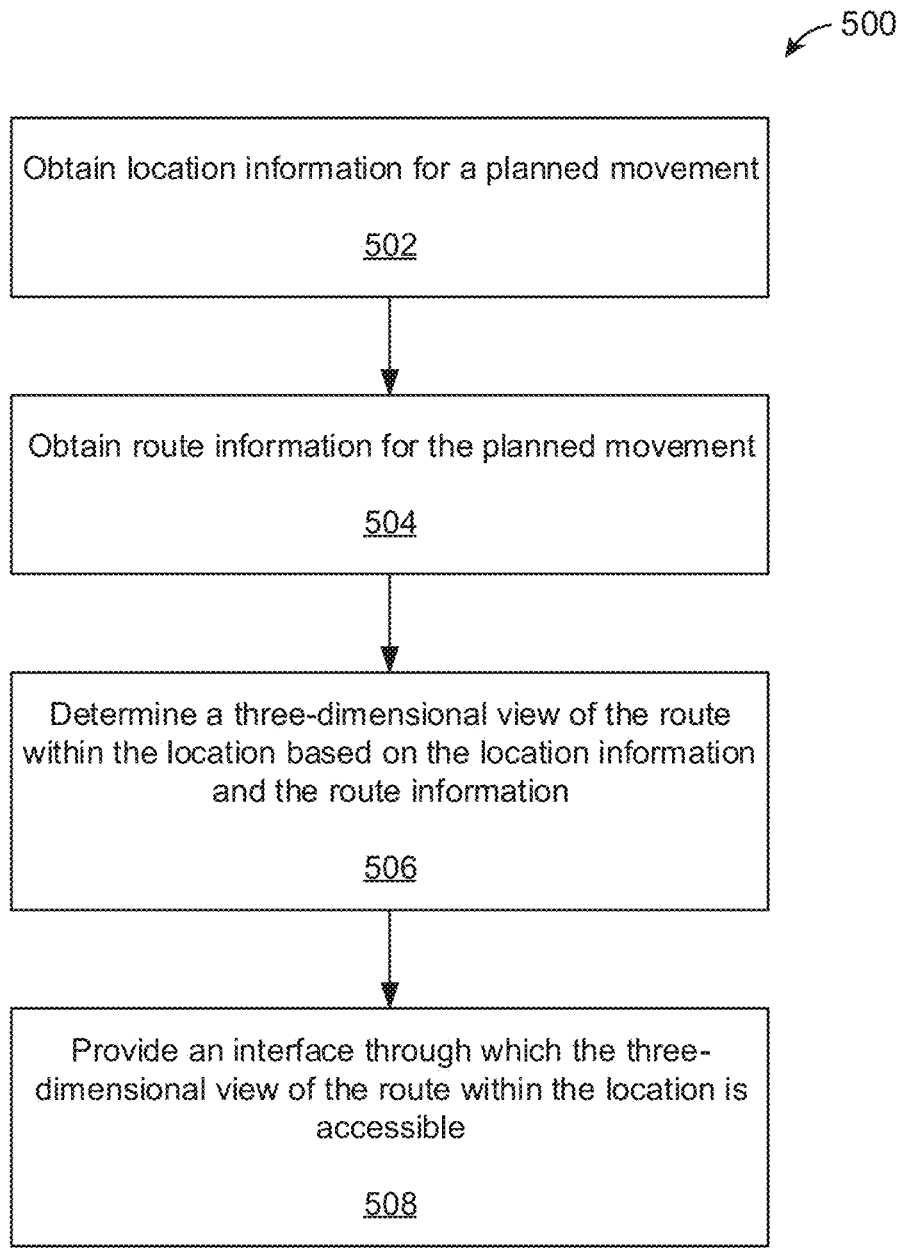
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, location information for a planned movement may be obtained. The location information may include tridimensional information of a location. At block 504, route information for the planned movement may be obtained. The route information may define a route of one or more entities within the location. At block 506, a three-dimensional view of the route within the location may be determined based on the location information and the route information. At block 508, an interface may be provided. The three-dimensional view of the route within the location may be accessible through the interface.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
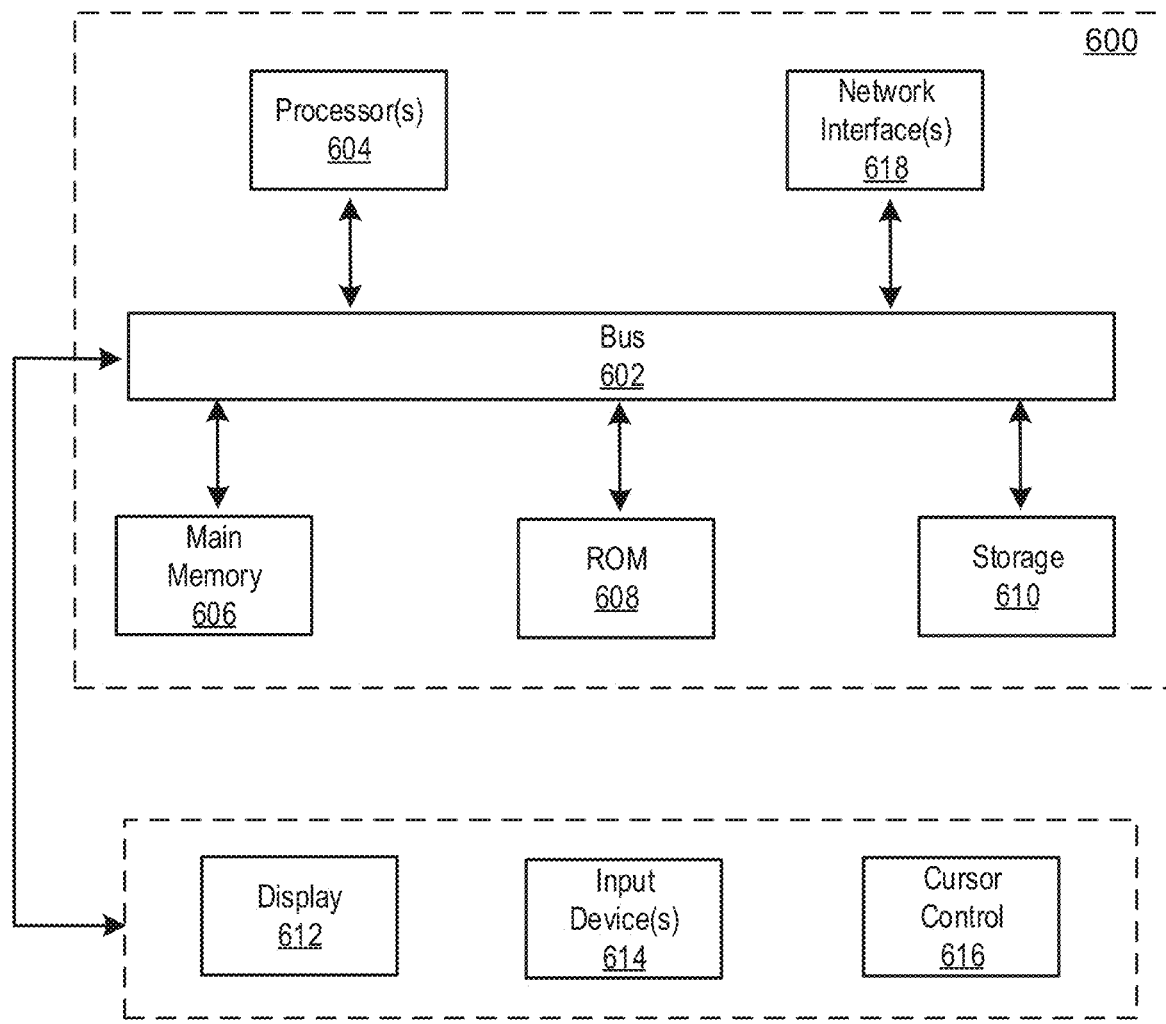
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
memory storing instructions that, when executed by the one or more processors, cause the system to perform:
obtaining location information for a planned movement, wherein the planned movement comprises a rescue operation, the location information including respective properties and positions of entities within one of one or more structures, each of the entities comprising a person, a vehicle, or an airborne entity, wherein the properties comprise respective identities and compositions of entities;
obtaining, for a first entity of the entities, route information for the planned movement, the route information comprising routes, each route comprising different route characteristics, wherein the first entity comprises a rescuing entity that performs the rescuing operation, and the route information is based on a risk that a portion of the one or more structures will fall onto a subset of the routes and a change in the risk, stemming from a specific event, the change in the risk being determined to be different depending on respective types of the first entity and a second entity being rescued by the first entity;
simulating, based on the route information, the planned movement from a first perspective of the first entity, a second perspective of the second entity, and a third perspective from an aerial frame of reference;
selecting or receiving a selection of a route based on the route characteristics; and
adjusting the selected route based on:
a manner in which a third entity uses the selected route, the third entity being distinct from the first entity.

2. The system of claim 1, wherein the tridimensional information defines three-dimensional geographic characteristics of the location.

3. The system of claim 2, wherein the location includes man-made structures or natural structures, and the tridimensional information defines the three-dimensional geographic characteristics of the man-made structures or the natural structures.

4. The system of claim 1, wherein the location information further includes environmental information of the location, the environmental information defining environmental characteristics of the location.

5. The system of claim 1, wherein the simulated planned movement is overlaid with the actual route.

6. The system of claim 1, wherein the simulated planned movement is further based on a lighting condition indicating whether the lighting condition will blind the entity along the simulated planned movement.

7. The system of claim 1, wherein the simulated planned movement is based on a first perspective associated with the entity and a second perspective associated with a third entity of the entities.

8. The system of claim 1, wherein the updating of the routes is in accordance with changes in potential risk information comprising information indicating a prospective structural integrity of the one of the one or more structures.

9. The system of claim 1, wherein the second entity is atop a structure.

10. The system of claim 1, wherein the simulating of the planned movement comprises predicting an effect of wind shaking and pushing the first entity off the planned route.

11. The system of claim 1, wherein the risk is based on a temporal proximity of an accident associated with the portion of the one or more structures.

12. The system of claim 1, wherein the first entity comprises an emergency responder, and the second entity is rescued by the emergency responder.

13. The system of claim 1, wherein the adjusting of the selected route is based on a first difference between an actual movement of the first entity and a planned movement of the first entity, and a second difference between an actual movement of the third entity and a planned movement of the third entity.

14. The system of claim 1, wherein the change in the risk is determined over time and space.

15. A method implemented by a computing system including one or more processors and storage media storing machine-readable instructions, wherein the method is performed using the one or more processors, the method comprising:
obtaining location information for a planned movement, wherein the planned movement comprises a rescue operation, the location information including respective properties and positions of entities within one of one or more structures, each of the entities comprising a person, a vehicle, or an airborne entity, wherein the properties comprise respective identities and compositions of entities;

obtaining, for a first entity of the entities, route information for the planned movement, the route information comprising routes, each route comprising different route characteristics, wherein the first entity comprises a rescuing entity that performs the rescuing operation, and the route information is based on a risk that a portion of the one or more structures will fall onto a subset of the routes and a change in the risk, stemming from a specific event, the change in the risk being determined to be different depending on respective types of the first entity and a second entity being rescued by the first entity;

simulating, based on the route information, the planned movement from a first perspective of the first entity, a second perspective of the second entity being rescued by the rescuing entity, and a third perspective from an aerial frame of reference;

selecting or receiving a selection of a route based on the route characteristics; and adjusting the selected route based on:
    a manner in which a third entity uses the selected route, the third entity being distinct from the first entity.

16. The method of claim 15, wherein the location includes man-made structures or natural structures, and the tridimensional information defines the three-dimensional geographic characteristics of the man-made structures or the natural structures.

17. A non-transitory computer readable medium comprising instructions that, when executed, cause one or more processors to perform:

obtaining location information for a planned movement, wherein the planned movement comprises a rescue operation, the location information respective properties and positions of entities within one of the one or more structures, each of the entities comprising a person, a vehicle, or an airborne entity, wherein the properties comprise respective identities and compositions of entities;

obtaining, for a first entity of the entities, route information for the planned movement, the route information comprising routes, each route comprising different route characteristics, wherein the first entity comprises a rescuing entity that performs the rescuing operation, and the route information is based on a risk that a portion of the one or more structures will fall onto a subset of the routes and a change in the risk, stemming from a specific event, the change in the risk being determined to be different depending on respective types of the first entity and a second entity being rescued by the first entity;

simulating, based on the route information, the planned movement from a first perspective of the first entity, a second perspective of the second entity being rescued, and a third perspective from an aerial frame of reference;

selecting or receiving a selection of a route based on the route characteristics; and adjusting the selected route based on:
    a manner in which a third entity uses the selected route, the third entity being distinct from the first entity.

\* \* \* \* \*